June 25, 1940.  B. STECHBART  2,205,546
SPROCKET DEVICE
Filed July 10, 1939
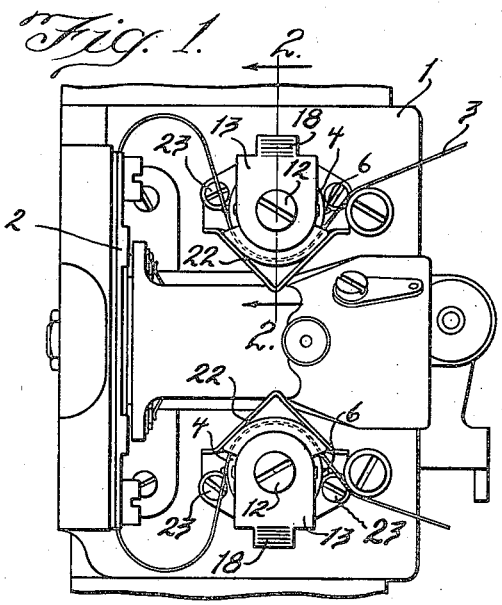
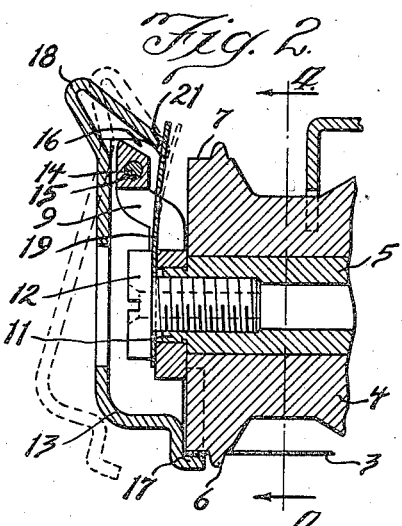
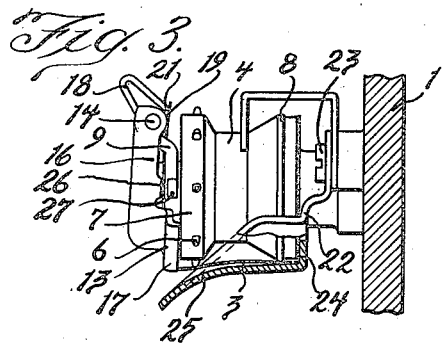
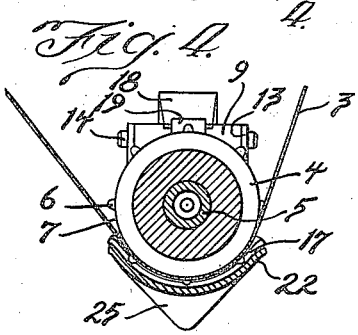
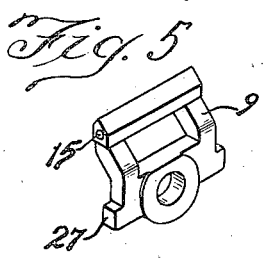
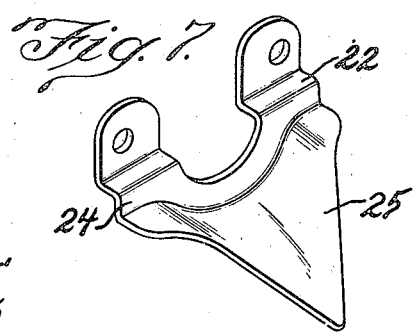
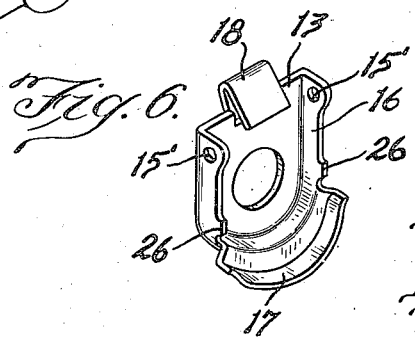
Inventor:
Bruno Stechbart
By: Robert F. Miehle
Atty.

Patented June 25, 1940

2,205,546

UNITED STATES PATENT OFFICE 2,205,546

SPROCKET DEVICE

Bruno Stechbart, Chicago, Ill., assignor to The Bell & Howell Company, Chicago, Ill., a corporation of Illinois Application July 10, 1939, Serial No. 283,620

10 Claims. (Cl. 271—2.3)

My invention relates to perforated film feed sprocket devices of motion picture machines, although not limited to this use alone, and has particular relation to such devices involving a sprocket having film perforation engaging teeth only at one end thereof.

The general object of the invention resides in the provision of a novel, convenient and effective guide means for releasably retaining a perforated strip on a sprocket and which prevents punching or embossing of the strip by reason of the guide being pressed against the strip while the strip rides on top of the teeth of the sprocket.

With this object in view my invention consists in certain features of novelty in the construction, combination, and arrangement of parts by which the said object and certain other objects, hereinafter appearing, are effected all as fully described with reference to the accompanying drawing, and more particularly pointed out in the appended claims.

In the said drawing—

Figure 1 is a partial side elevation of a motion picture projecting machine embodying my invention;

Figure 2 is an enlarged partial section substantially on the line 2—2 of Figure 1;

Figure 3 is a partial front elevation of the mechanism with parts broken away and shown in section;

Figure 4 is a sectional view substantially on the line 4—4 of Figure 2; and

Figures 5, 6 and 7 are perspective views of the essential parts of the guide structure hereinafter described.

Referring to the drawing, 1 designates the frame of a motion picture projecting machine provided with a usual projection apertured intermittent film feed guide 2 to and from which a conventional perforated film strip 3' is fed by means of revoluble feed sprockets 4, these sprockets engaging the film strip between the guide 2 and rolls of the film strip on usual feed and take-up reels not shown. See Figure 1.

Referring to one of the sprockets, they and their associated structures being identical, the sprocket 4 is bored, as shown in Figure 2, and is revolubly mounted on a stationary projecting spindle 5 suitably mounted on the frame 1. As shown the sprocket 4 has film strip perforation engaging teeth 6 only at the outer end thereof and has film face engaging surfaces 7 and 8 at its outer and inner ends.

A bored mounting member 9 is secured on the outer end of the spindle 5 by engagement of its bore on the reduced outer end 11 of the spindle and a headed screw 12 screwthreaded into the outer end of the spindle. See Figure 2.

A guide member 13 is pivotally mounted on the mounting member 9 on an axis normal to an axial plane of the spindle 5 and sprocket 4 by means of a pin 14 engaged in a bore 15 of the member 9 and alined bores 15' through the terminal portions of a generally U-shaped flange 16 of the guide member, the guide member being preferably formed of a sheet metal stamping. See Figures 2, 3, 5 and 6. The guide member 13 is thus mounted for pivotal movement lengthwise of the sprocket.

The intermediate portion of the flange 16 of the guide member 13 is extended to form an arcuate guide portion 17 extending correspondingly with the periphery of the sprocket, and this guide portion is movable lengthwise of the sprocket into and out of film strip engaging position as is illustrated by the full and broken line positions of the guide member 13 shown in Figure 2. The guide member 13 is provided with a doubled back generally radial extension 18 for manual movement thereof out of film retaining position, and a bored flat spring 19 is secured with the mounting member 9 and spindle 5 by means of the screw 12 and engages the doubled back end of the extension 18, as indicated at 21, to yieldably urge the guide member 13 into and to normally maintain the same in film retaining position as shown in full lines in Figure 2.

A second guide member 22 is secured on the frame 1, as designated at 23, and is preferably formed of a sheet metal stamping. This guide member provides a film strip edge engaged portion 24 at the inner end of the sprocket 4 and an arcuate film strip face engaging portion 25 extending from the portion 24 toward the guide member 13 and flaring away from the sprocket 4 in the same direction.

Movement of the guide member 13 into film strip retaining position is limited by a stop comprising stop formations 26 on the flange 16 engaging stop formations 27 on the mounting member 9, thus determining the film strip retaining position of this guide member as yieldably urged by the spring 19.

To lace the film strip on the sprocket, the film strip is inserted edgewise between the portion 25 of the guide member 22 and the sprocket 4, and on the outside of the portion 17 of the guide member 13, inward movement of the strip being limited by the edge guide portion 24 of the guide 22 being engaged by the inner edge of the strip.

The guide member 13, having been manually actuated out of its film retaining position as shown in broken lines in Figure 2, is released after insertion of the film strip to be urged by the spring 19 into film retaining position.

If the perforations of the film strip are engaged on the teeth 6 of the sprocket, as shown in Figure 2, the spring 19 moves the guide member 13 into film retaining position, as show in full lines in Figure 2, in which the guide portion 17 engages the outer face of the film strip to retain the film strip on the sprocket with the perforations of the strip engaged on the teeth 6.

However, if the film strip rides on top of the teeth 6 of the sprocket by reason of the perforations of the strip not registering with the teeth of the sprocket, as shown in Figure 3, movement of the guide member 13 into film retaining position by the spring 19 is interrupted by the edge of the guide portion 17 of the guide 13 engaging against the outer edge of the strip, as is also shown in Figure 3, the inner edge of the strip being engaged against the edge guide portion 24 of the guide 22, this condition being continued until the film strip is properly engaged on the sprocket by longitudinal movement of the strip relative to the sprocket to register the film perforations thereof with the teeth 6 of the sprocket and movement of the strip into proper engagement with the sprocket. Proper engagement of the film strip on the sprocket being accomplished the outer edge of the strip disengages from the edge of the guide portion 17 whereupon the spring 19 moves the guide 13 into film retaining position as shown in Figure 2.

Removal of the film strip from the sprocket is accomplished by manually positioning the guide member 13 out of film retaining position and removing the strip in an obvious manner.

It will be observed that punching or embossing of the film strip by pressing it against the sprocket teeth is eliminated in that the guide member 13 cannot press the strip against the sprocket teeth.

While I have thus described my invention, I do not wish to be limited to the precise details described as changes may be readily made without departing from the spirit of my invention, but having thus described my invention I claim as new and desire to secure by Letters Patent the following:

1. In a device of the character described, the combination with a revoluble sprocket, of a strip retaining guide therefor and mounted for movement lengthwise of the sprocket and provided with a strip engaging portion engageable with an edge of a perforated strip when the strip rides on the top of the teeth of the sprocket and engageable with the outer face of the strip when the perforations of the strip are engaged on the teeth of the sprocket and yieldably urged to engage the strip, and a second guide engageable with the opposite edge of the strip.

2. In a device of the character described, the combination with a revoluble sprocket, of a strip retaining guide therefor and mounted for movement lengthwise of the sprocket and provided with an arcuate strip engaging portion engageable with an edge of a perforated strip when the strip rides on the top of the teeth of the sprocket and engageable with the outer face of the strip when the perforations of the strip are engaged on the teeth of the sprocket, spring means yieldably urging said guide to engage the strip, a stop limiting strip engaging movement of said guide, and a second guide engageable with the opposite edge of the strip.

3. In a device of the character described, the combination with a revoluble sprocket, of a strip retaining guide therefor and mounted for movement lengthwise of the sprocket and provided with a strip engaging portion engageable with an edge of a perforated strip when the strip rides on the top of the teeth of the sprocket and engageable with the outer face of the strip when the perforations of the strip are engaged on the teeth of the sprocket and yieldably urged to engage the strip, and a second guide engageable with the opposite edge of the strip and provided with a strip face engaging portion extending toward the first mentioned guide member and flaring away from the sprocket in the same direction.

4. In a device of the character described, the combination with a revoluble sprocket having teeth at one end only, of a strip retaining guide associated with the toothed end thereof and mounted for movement lengthwise of the sprocket and provided with an arcuate strip engaging portion engageable with an edge of a perforated strip when the strip rides on the top of the teeth of the sprocket and engageable with the outer face of the strip when the perforations of the strip are engaged on the teeth of the sprocket, spring means yieldably urging said guide to engage the strip, a stop limiting strip engaging movement of said guide, and a second guide engageable with the opposite edge of the strip and provided with an arcuate strip face engaging portion extending toward the first mentioned guide member and flaring away from the sprocket in the same direction.

5. In a device of the character described, the combination with a stationary projecting spindle and a bored sprocket revolubly mounted thereon, of a strip retaining guide for said sprocket, and a mounting carrying said guide on the projecting end of said spindle for movement into and out of strip retaining position.

6. In a device of the character described, the combination with a stationary projecting spindle and a bored sprocket revolubly mounted thereon, of a strip retaining guide for said sprocket, and a mounting carrying said guide on the projecting end of said spindle for pivotal movement on an axis transverse to an axial plane of said spindle for movement into and out of strip retaining position.

7. In a device of the character described, the combination with a stationary projecting spindle and a bored sprocket revolubly mounted thereon, of a strip retaining guide for said sprocket, a mounting carrying said guide on the projecting end of said spindle for movement lengthwise of said sprocket into and out of strip retaining position, spring means operative between said mounting and said guide and yieldably urging said guide into strip retaining position, and stop means operative between said mounting and said guide to limit strip engaging movement of said guide.

8. In a device of the character described, the combination with a stationary projecting spindle and a bored sprocket revolubly mounted thereon, of a strip retaining guide for said sprocket and provided with an arcuate strip engaging portion, a mounting carrying said guide on the projecting end of said spindle for pivotal movement lengthwise of said sprocket to position said arcuate portion in and out of strip retaining position, spring means yieldably urging said guide into strip retaining position, and stop means limiting strip retaining movement of said guide.

9. In a device of the character described, the combination with a stationary projecting spindle and a bored sprocket revolubly mounted thereon and having teeth only at the outer end thereof, of a strip retaining guide associated with the outer end of said sprocket and provided with an arcuate strip engaging portion, a mounting carrying said guide on the projecting end of said spindle for movement lengthwise of said sprocket whereby said arcuate portion is engageable with an edge of a perforated strip when the strip rides on the top of the teeth of the sprocket and engageable with the outer face of the strip when the perforations of the strip are engaged on the teeth of the sprocket, yieldable means urging said guide into strip retaining position, and a second guide engageable with the opposite edge of the strip.

10. In a device of the character described, the combination with a stationary projecting spindle and a bored sprocket revolubly mounted thereon and having teeth only at the outer end thereof, of a strip retaining guide associated with the outer end of said sprocket and provided with an arcuate strip engaging portion, a mounting carrying said guide on the projecting end of said spindle for pivotal movement lengthwise of said sprocket whereby said arcuate portion is engageable with an edge of a perforated strip when the strip rides on the top of the teeth of the sprocket and engageable with the outer face of the strip when the perforations of the strip are engaged on the teeth of the sprocket, spring means yieldably urging said guide to engage the strip, a stop limiting strip engaging movement of said guide, and a second guide engageable with the opposite edge of the strip and provided with an arcuate strip face engaging portion extending toward the first mentioned guide member and flaring away from the sprocket in the same direction.

BRUNO STECHBART.